Patented Dec. 21, 1937

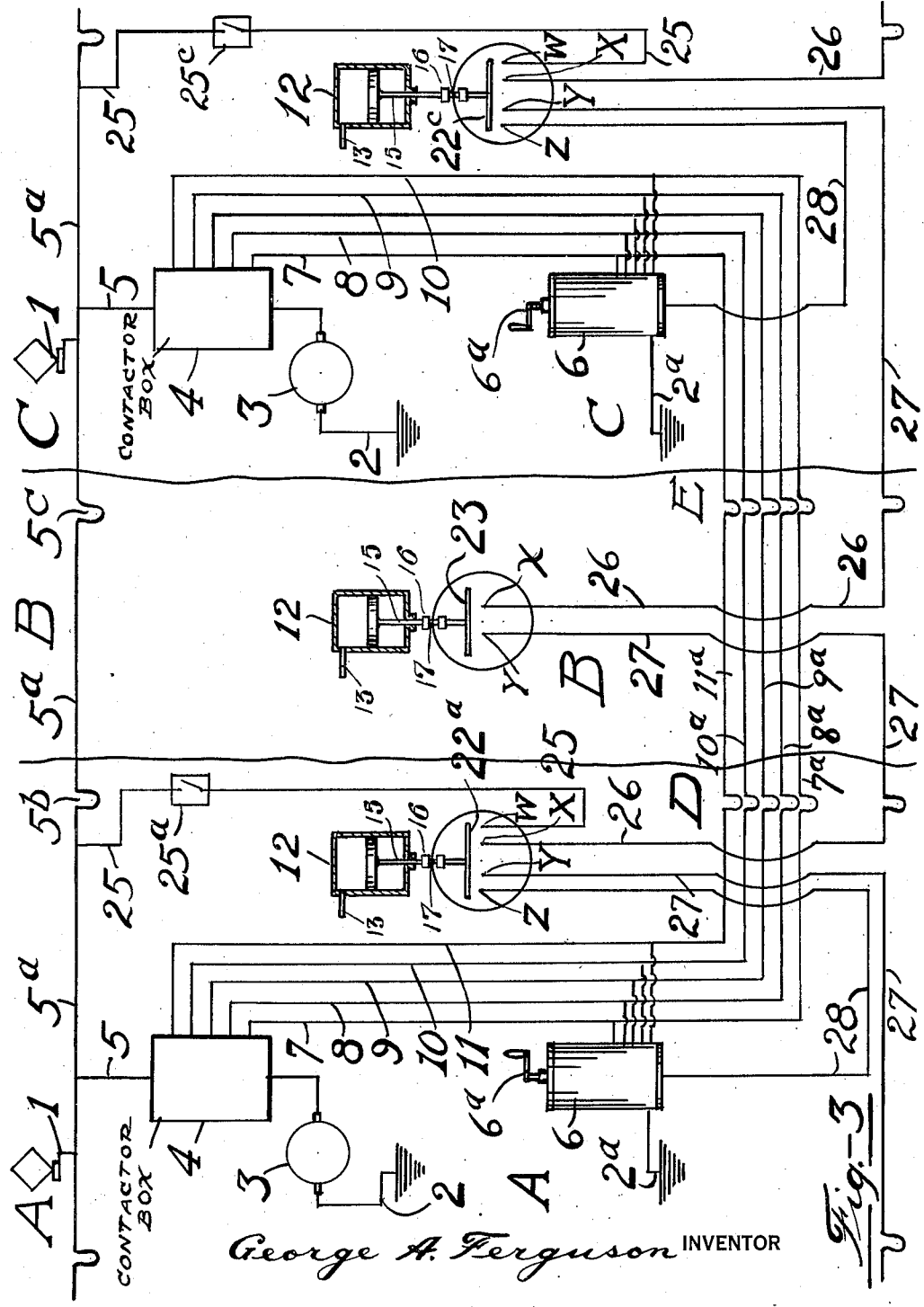

2,102,791

UNITED STATES PATENT OFFICE 2,102,791

METHOD AND MEANS FOR PREVENTING FLAT WHEELS

George A. Ferguson, New York, N. Y.

Application September 12, 1935, Serial No. 40,280

5 Claims. (Cl. 192—2)

Figure 1:
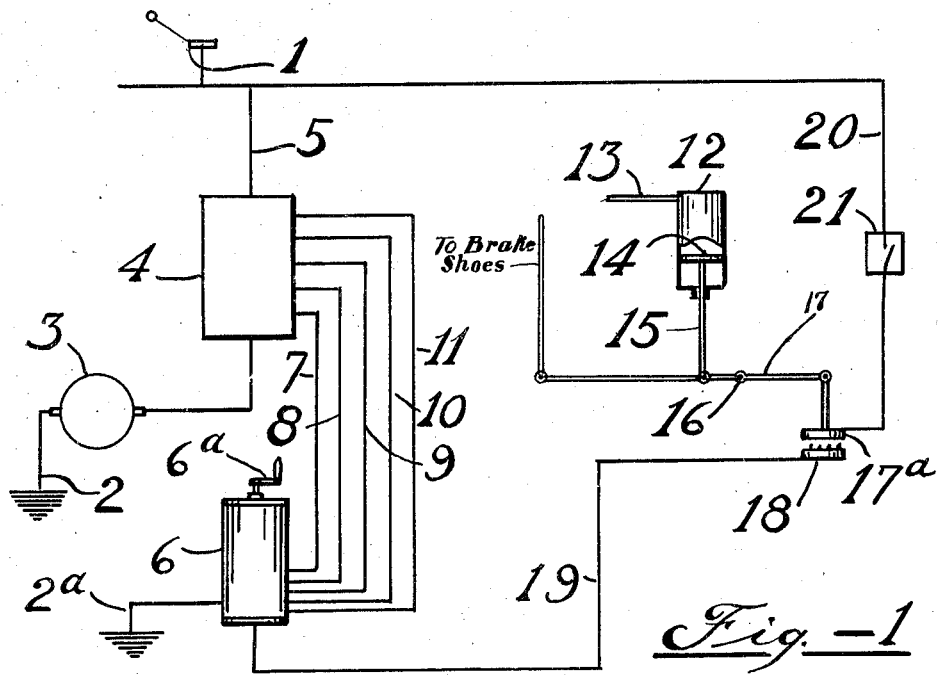
Figure 2:
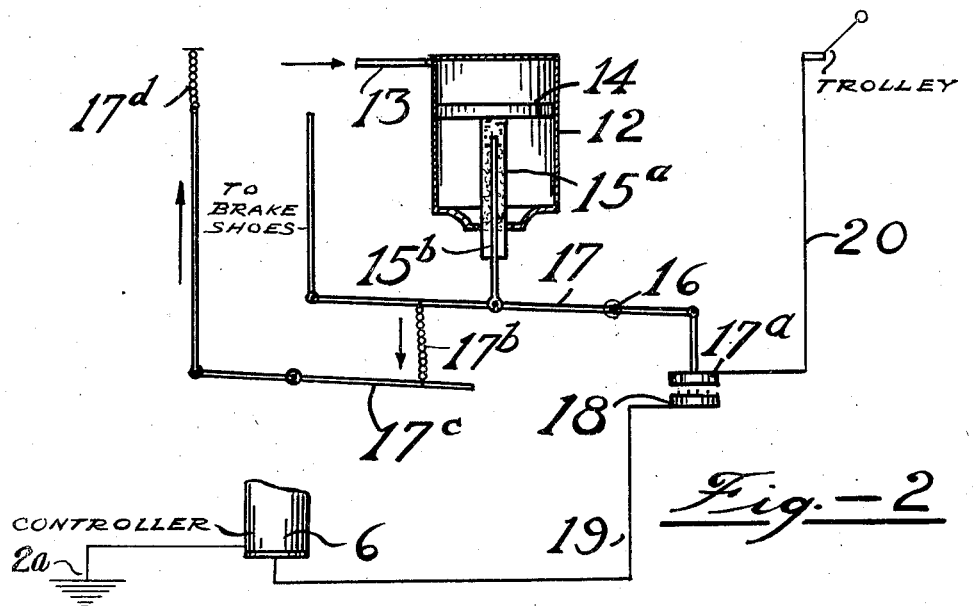

The present invention relates to improvements in electric railway circuits and more specifically to a circuit arranged to greatly reduce wear and tear on wheels, brakes and related equipment. The invention will be fully understood from the following description and the drawings:

In the drawings Fig. 1 is a diagrammatic representation of the electric circuits and ancillary equipment necessary for a single car train;

Fig. 2 is a diagrammatic drawing of the brake mechanism showing an arrangement of the circuit and its relation to the air and hand brakes; and Fig. 3 is a diagrammatic drawing showing the electrical and brake connections for a three-car train in which two power cars are used and the third is a trailer or non-power car.

One of the largest items in the maintenance of electric railways is the cost of replacing and repairing flat wheels. Everyone is familiar with the annoyance caused by flat wheels but besides the noise, they are also the cause of derailments and accidents of this sort. I have found that flat wheels occur principally on those wheels which are not connected with the car motors; that is to say idling wheels. Ordinarily on a single car only one set of wheels are power wheels but brakes are applied to all of the wheels. Thus when the brakes are properly adjusted and set the friction is not sufficient to hold the power wheels but, on the other hand, it is sufficient to hold the non-power or idling wheels so that if the brakes are applied and the motor is started at the same time, the idling wheels are caused to slide and are excessively worn at the point in contact with the rail. I have found that this is the greatest cause for flat wheels and have also found that if this is eliminated, the number of flat wheels is greatly decreased and consequently the cost, annoyance and danger of flat wheels is greatly reduced.

In multi-car trains, it is frequently the practice to use one or more power cars with one or more trailer cars on the latter of which there are no motors. The power cars are capable of pulling the entire train even though the brakes are applied to the trailer car. The result of this is the rapid flattening of wheels of the trailer cars if the brakes are applied to these when the power is on.

The object of the present invention is to prevent in a large measure the cause of flat wheels on single-car as well as on multi-car trains. Another object is to decrease the danger of fires caused by friction of locked or partially locked wheels, to reduce wear and tear on the electric overload equipment and the like. By means of the present invention the noise and the danger incident to flat wheels will be greatly decreased by removing the principal cause for the flattening of the wheels.

Referring to Fig. 1, reference numeral 1 denotes the trolley or third rail or other device from which the current is derived. Numeral 2 is the ground wire which is attached to one pole of the motor 3, the other pole being attached to a contactor box 4. This contactor box is not shown in detail but is made in the usual form containing a series of circuit breakers which are opened and closed by a separate control circuit of lower or less voltage. The power circuit is represented by the wire from the trolley through a wire 5 to the contactor box 4 and thence to the motor and to the ground 2.

The numeral 6 represents the control switch by which the motorman operates the car. This again is not shown in detail but is preferably of the cylindrical type and the crank or handle 6a is shown. The contactor box and the control switch are connected by a plurality of wires 7, 8, 9, 10 and 11 each of which may be brought into connection by manipulation of the control crank or handle 6a. There is a ground connection 2a. By turning this crank, the one or the other of the circuits through the wires 7, 8, 9, 10 and 11 may be completed and corresponding connections are made in the power circuit by means of the contactor box 4. In this way the amount of current passing through the motor may be greatly increased or decreased as the car starts or stops.

The air brake cylinder 12 with the air line 13, piston 14 and the piston rod 15 are shown at the right of the diagram. Since the drawings are merely diagrammatic, no valve system is shown on the brake although, of course, it is provided in the usual way. The lever 17 pivoted at the point 16 is connected at one end to the piston rod 15. Thus far the electrical equipment is standard. It will be understood that any type of contactor box or control may be used and other connections equivalent to this shown may be employed.

The other end of lever 17 carries one member of a switch 17a. The other member of the switch, 18, is provided and so placed that when the brake is set or applied, the switch is opened and when the brake is off the switch is closed by bringing together the members 17a and 18. The wire 19 connects the switch point 18 with the control switch 6 and a corresponding wire 20 runs from the trolley through a switch 21 to the switch member 17a.

In the operation of the above described equipment, it will be readily noted that when the brake is applied by forcing compressed air into the cylinder 12 by means of the line 13, the piston 14 and the rod 15 are forced outwardly so that the switch points 17a and 18 are separated. The switch it will be seen is a portion of the control circuit and when the switch is open the control circuit cannot be completed and consequently the power circuit cannot be completed and the train cannot be started. In order to start the train it is necessary to release the air brakes which cause the switch points 17a and 18 to be brought in contact. This completes the control circuit so that then a manipulation of the control handle 6a will cause the current to flow through the control circuit, make proper contacts in the contactor box 4 and complete the power circuit causing the motor and the car to start.

Turning to Fig. 2, the brake cylinder is shown at 12 as before with the piston 14 and a piston rod 15a in the form of a sleeve fastened at one end to the piston rod and open at the other. A rod 15b is fitted in the sleeve and is attached to the lever 17 as before. One end of the lever just as before carries the switch point 17a and the corresponding member 18 is provided as before with the lead wire connected just as shown in Fig. 1. To the other end of the lever 17 a second lever 17c is connected by means of a chain 17b and in turn the other end of this lever carries a chain 17d which is connected with the hand-brake wheel at the ends of the car (not shown).

This diagram can be understood without difficulty and merely shows that the switch mechanism may be connected not only to the airbrake but to the emergency hand-brakes as well. From the above description, the operation of the air-brake can be sufficiently understood. If the hand-brake is applied pulling the chain 17d in the direction of the arrow, a corresponding motion is produced in the chain 17b in the direction of the arrow associated therewith and this movement is communicated by means of the lever 17 separating the switch members 17a and 18. In producing this motion the rod 15b merely slides out of the sleeve 15a so that the position of the piston itself is not changed. It will be understood that an application of the emergency hand-brake, whether by the operator or by some unauthorized person, will thus break the control circuit and it will be impossible to start the car until this brake is released.

Now turning to Fig. 3, a multi-car train equipment is shown. The rectangles marked "A", "B" and "C" represent the cars themselves and in each of the rectangles is included the equipment which will be carried by each car, although it will be understood that the diagram does not represent the actual position of any of this equipment on the car itself. Cars A and C are power cars on which motors are supplied while car B is a trailer car which does not have a motor but which is fitted with brakes.

The power cars show the motor 3, contactor box 4, control switch 6 and the associated connections just as before. There is the same trolley wire 1 for each power car and a bus 5a runs the entire length of the train with jumpers 5b and 5c between cars A and B and B and C respectively. Furthermore, the wires connecting the contactor box 4 and the control switches 6, namely wires 7, 8, 9, 10 and 11, are also connected by jumpers or boxes D and E between cars A and B and B and C respectively, and through corresponding wires 7a, 8a, 9a, 10a and 11a provided on the trailer car.

There is likewise a difference in the wiring of the brakes. Instead of the single point switches illustrated on the single car in Fig. 1, it is necessary to supply four-point switches on 22a and 22c, the power cars A and C, and a two-point switch 23 on the trailer car B. The first point on the power car switches is marked "W" and is connected to the power bus 5a by means of a line 25 and a switch 25a on car A and 25c on car C. The second switch point marked "X" is connected by a wire 26 which will be attached to a car placed to the right of the particular car under discussion if there be a car at that point. Thus the line 26 on car A is connected to the point Y of the trailer car through the line 27 and since there is no car to the right of the car C, the end of the line 26 is left loose. The third point Y carries a wire 27 which is normally joined to the car at the left of car A, but since there is no car at this point it is left loose. On car C the line 27 is connected to the trailer car at its left to point X on the switch supplied with the trailer car. The points Z on the cars A and C are connected by wires 28 to the control switches 6 on each of the respective cars. The operation of switches 22a and 22c is such as to bring all of the points W to Z into electrical contact.

As indicated before, only a two-point switch is required on the trailer car. This has the points X and Y one of which is connected to the car at the right and the other to the car at the left as has been indicated above.

In the operation of a multi-car train, let us suppose that it is to be operated from car A. The switch 25a will be opened and the corresponding switch 25c on car C will be closed. The operator will manipulate the control switch 6 on car A and the corresponding control switch on the car C will be either disconnected at the switch or the handle will be removed so that it cannot be manipulated leaving the switch open. Thus the control box 6 extends its control not only to the motor on car A but also to the motor on car C and if other power cars in the train are provided, then it will control the motors on those as well. In this condition the train is ready for operation and the following electric control connections will make the operation clear: Current will be taken from the trolley 1 through the line 25 and through the closed switch 25c. No current will pass through the open switch 25a. From the switch 25c current passes to the first point marked W on the switch of car C, then through X, Y and Z on that car, likewise through the points X and Y on the trailer car and thence to the car A where it passes through the points from X to Z and into the control switch and from there to ground 2a. Thus it will be seen that the switches marked generally at 22a, 23 and 22c are all directly in the control circuit and the breaking of any one of these several switches is sufficient to prevent the completion of the control circuit. Thus when any one of the brakes on any one of the cars is applied, it will be impossible to bring current to any of the motors on the entire train and thus the train cannot be started so long as the brakes are applied.

My invention is not to be limited to any theory of the mechanism nor to any particular types of brakes, switches or circuits, nor to single-car or to multi-car trains, but only by the following claims in which it is desired to claim all novelty inherent in the invention.

I claim:

1. In a multicar electric train, in which there are at least two power-driven cars, a single multiple control circuit adapted to complete and break power circuits of the power cars at the will of a single operator, switches in said control circuit for each car and associated with the brakes thereof, whereby application of the brakes of any car in the train prevents completion of the control circuit.

2. In a multicar electric train, in which there are power and trailer cars, power circuits on each of the power cars, a single control circuit running throughout the entire train, and switches in said circuit in each of the cars associated with the brakes thereof, whereby application of the brakes on any car of the train prevents the completion of the control circuit.

3. In apparatus for electrically propelling wheeled vehicles, including propulsion means and electrically actuated control means therefor, a control actuating means comprising a plurality of control means actuating elements connected in parallel to said control means and in series with a plurality of circuit breaking switches to a circuit energizing said elements, said switches being operatively and individually connected to the independently operated brake mechanisms of the respective wheels on said vehicles whereby the control means actuating elements are simultaneously de-energized whenever any vehicle brake is positively set and means for supplying power to said element energizing circuit from a single point on the power line.

4. Apparatus according to claim 3, in which the brake mechanisms include power operated brake actuating means and manual means and a lever system to which said circuit breaking switches are operatively and individually connected.

5. Apparatus for electrically propelling wheeled vehicles including control means therefor, comprising, a plurality of motors connected in parallel to a single source of energy, means for electrically controlling said motors, individually, disposed between said motors and the source of energy, multiple means for electrically actuating said control means connected in parallel to said control means and in series with a plurality of circuit breaking elements in an electrical circuit providing energy for said actuating means, said circuit breaking elements being actuated individually by the respective brake mechanisms of said vehicles whereby the motor control actuating means is de-energized whenever any vehicle brake is in a positively set position.

GEORGE A. FERGUSON.